United States Patent [19]

Kanda

[11] Patent Number: 4,731,101
[45] Date of Patent: Mar. 15, 1988

[54] DUST COLLECTOR

[76] Inventor: Kinzo Kanda, 6-27, Doshida 4-chome, Nerima-ku, Tokyo, Japan

[21] Appl. No.: 917,417

[22] Filed: Oct. 10, 1986

[30] Foreign Application Priority Data

Oct. 14, 1985 [JP] Japan ............... 60-157686[U]

[51] Int. Cl.$^4$ ............................................. B01D 50/00
[52] U.S. Cl. ........................................ 55/323; 55/325; 55/337; 55/413; 55/472; 55/DIG. 3
[58] Field of Search ............... 55/337, 323, 325, 288, 55/459 R, DIG. 3, 413, 472

[56] References Cited

U.S. PATENT DOCUMENTS

| | | | |
|---|---|---|---|
| 1,133,543 | 3/1915 | Duffie | 55/337 |
| 1,458,720 | 6/1923 | Malone | 55/288 |
| 1,464,741 | 8/1923 | Bennett | 55/325 |
| 2,247,472 | 7/1941 | Bible | 55/337 X |
| 2,295,984 | 9/1942 | Wilson | 55/288 |
| 2,364,877 | 12/1944 | Smellie | 55/337 X |
| 2,380,382 | 7/1945 | Baker | 55/325 X |
| 2,432,757 | 12/1947 | Weniger | 55/459 R X |
| 2,943,698 | 7/1960 | Bishop | 55/337 |
| 3,046,718 | 7/1962 | Ide et al. | 55/323 |
| 3,853,517 | 12/1974 | Mitchell | 55/DIG. 3 X |
| 4,172,710 | 10/1979 | Van der Molen | 55/DIG. 3 X |

FOREIGN PATENT DOCUMENTS

| | | | |
|---|---|---|---|
| 168054 | 12/1981 | Japan . | |
| 166481 | 3/1934 | Switzerland | 55/337 |
| 442108 | 2/1936 | United Kingdom | 55/323 |

*Primary Examiner*—Kathleen J. Prunner
*Attorney, Agent, or Firm*—Oblon, Fisher, Spivak, McClelland & Maier

[57] ABSTRACT

A cyclone dust collector is comprised of a lower dust chamber (5) having a tangential air inlet (10) and an upper dust chamber (4) in combination with a suction device. A dividing plate separates the upper and lower dust chambers from one another. A communicating duct (2) is installed in the dividing plate (3) in such a manner to extend downward into the lower dust chamber (5), and a cyclone drum (15) is supported in such a manner to enclose the dust (2). A disk (17) is supported to vertically divide the inside of the drum (15) into a pair of upper and lower parts. The air introduced into the lower dust chamber (5) is caused to flow in a swirl in the cyclone drum (15), the dust particles in the air are separated by centrifugalization to be allowed to drop along the inside wall of the drum (15) and the separated dust particles fall onto the bottom of the cyclone drum (15) without being affected by the swirling flow.

8 Claims, 2 Drawing Figures

DUST COLLECTOR

BACKGROUND OF THE INVENTION

1. Field of the Invention

This invention relates in general to a dust collector and, in more particular, to such a device of the type which separates the dust particles from a vortex of air developed in a drum.

2. Description of the Prior Art

There have been various types of cyclone dust collectors developed in the prior art which, as might be represented by Japanese laid-open utility model application No. 56-168054 proposed by the assignee of this invention, typically comprises a dust chamber carrying at an upper part thereof an exhaust pipe in which a funnel-shaped cyclone drum is installed. The drum is formed to open at a lower end thereof into the chamber. With this arrangement, negative pressure is developed in the chamber in order to introduce dust carrying air into the chamber where it is caused to swirl by the circular wall surface of the chamber. The swirling air then makes its way into the drum through its lower opening, thereby further accelerating its swirling speed. Centrifugal force in the drum acts to separate the dust particles contained in the air stream. Dust particles thus centrifugalized are allowed to drop along the inside slope of the funnel-shaped drum all the way onto the bottom where they deposit for subsequent disposal.

However, these conventional dust collectors have been found to suffer from the disadvantage that the vortex of air developed in the drum has tended to blow centrifugalized dust particles about to drop along the inclined inside surface of the drum, often resulting in poor performance of dust collection. One proposed solution is to steepen the inside slope of the funnel-shaped drum to such an extent that the dust particles, upon centrifugalization, are allowed to take a quick fall before they are carried away in the vortex of the air. But this change in the design of the drum would give rise to a problem of increasing the overall height of the collector.

The present invention has been proposed to eliminate the above-mentioned drawback of the conventional cyclone dust collectors.

SUMMARY OF THE INVENTION

It is therefore a primary object of the present invention to provide an improved cyclone dust collector which is capable of efficiently separating the dust particles from a vortex of air by centrifugalization.

It is another object of the present invention to provide such a dust collector which is compact in construction.

The above and other objects, features and advantages of the present invention are achieved by a cyclone dust collector which comprises a cylindrical shell vertically divided by a horizontal dividing plate into a pair of upper and lower dust chambers. An air inlet is provided mounted in the outside wall of the lower chamber to permit the entrance of dust-containing ambient air into the shell. Negative pressure generating means is provided in the shell to create a negative pressure in the upper chamber through a suction port provided in it. A communicating duct is mounted substantially in the center of the dividing plate in such a manner to extend downwardly into the lower chamber to establish air-flow relationship between the chambers. A cyclone drum with a closed bottom is mounted in the lower chamber in such a manner to enclose the duct and spaced away from the lower surface of the dividing plate to define a narrow air gap between the plate and the top end of the lower chamber. A disk is provided supported in the drum at a height that divides the drum interior into a vertical pair of upper and lower spaces one of which is spaced away from the lower end of the duct.

DETAILED DESCRIPTION OF PREFERRED EMBODIMENTS

Figure 1:
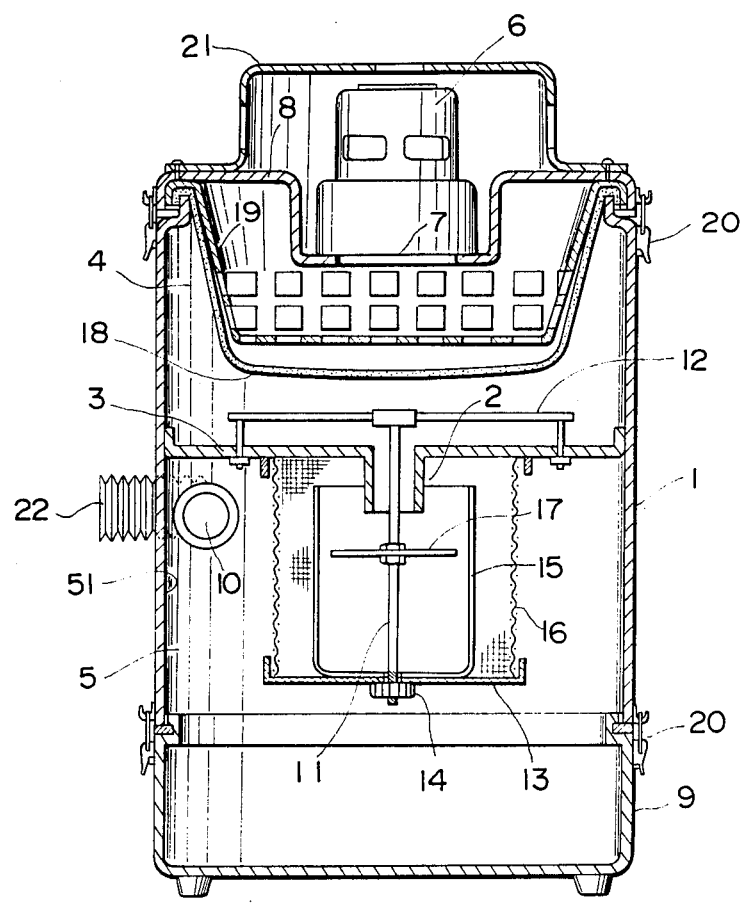
FIG. 1 is a cross-seciton view of a first preferred embodiment according to the preset invention.

Referring first to FIG. 1, which shows a first preferred embodiment of the dust collector according to the present invention which comprises a cylindrical shell 1, which is divided vertically by a horizontal dividing plate 3 into a pair of upper and lower dust chambers 4 and 5. The shell 1 has its top opening tightly closed by a top lid 8, which may preferably be detachably secured with suitable fasteners 20 at locations along the periphery of the lid to provide easy maintenance access to the inside of the shell 1.

On the lid 8 is centrally mounted a ventilating fan 6, installed to have its front faced downward. Opposite the front of the fan 6 is bored centrally in the lid 8 an exhaust hole 7 to permit escape of the internal air from within the shell 1 as when the fan 6 is operated. Preferably, the fan 6 may be protected by a cover 21 removably secured over the shell 1.

Also, the bottom opening of the shell 1 is tightly closed by a bottom lid 9, which may preferably be detachably secured with fasteners 20 at locations along the periphery of the lid for easy maintenance. Preferably, the bottom lid 9 may be shaped like a tray to receive the dust and dirt collection by operation; whenever a deposit of dust particles is formed on the tray 9, it will be removed and transported in order to empty the deposit into a waste bucket or disposer.

The shell 1 is equipped with an air inlet 10 in the wall 51 of the lower chamber 5. Preferably, the inlet 10 may be positioned at such an angle so as to hold its axis tangential to the circular circumference of the wall 51. This arrangement enables the air entering the lower chamber 5 through the inlet 10, when negative pressure is developed inside the shell 1 by the fan 6 in operation, to flow along the inside wall surface of the lower chamber 5 into a vortex.

A communicating duct 2 is centrally mounted in the dividing plate 3 to extend downward into the lower chamber 5 establishing air-flow relationship between the chambers 4 and 5. Opposite the bottom opening of the duct 2 is disposed centrally in the lower chamber 5 a cyclone drum 15 having a circumferential surface, an open top end and a closed bottom. The drum 15 is mounted on a platform 13, which is supported by a hanging bolt 11. The bolt 11 is secured at a top end thereof to a support base 12 that is mounted in fixed position on the upper surface of the plate 3, and extends downward into the lower chamber 5 through the duct 2 to removably secure the drum 15 to the platform 13.

A disk 17 is horizontally supported within the drum 15, properly spaced away from the dividing plate 3, dividing the drum inside into a pair of upper and lower spaces. The upper space is provided to enable the air entering the drum 15 to develop, upon impinging on the disk 17, into a high-speed vortex of air for centrifugalization of dust particles contained therein. The lower space beneath the disk 17 is provided to permit the dust particles separated to fall onto the bottom lid 9 without being affected by the swirling air occurring above the disk.

The platform 13 is set by a nut 14 fitted about the bolt 11 to a predetermined height such that the drum 15 is properly supported and spaced away from the lower surface of the plate 3 enough to define an air gap between the plate and the edge of the circumferential surface of the drum 15 at the top upper end of the drum 15. This air gap is dimensioned to enable the air swirling about the drum 15 to enter, by suction developed by the fan 6, into the drum with accelerated speed.

A wire filter 16 formed into a cylindrical shape larger in diameter than the drum 15 is provided to enclose the drum. The cylindrical filter 16 is provided to filter out the larger dust particles from the swirling air as it flows into the drum 15.

Opposite the exhaust hole 7 in the upper chamber 4 is supported a filter 18 for screening the finer dust particles from the air driven, by suction from the fan 6, from the cupper chamber through the hole 7. Preferably, the filter 18 is held against a rigid frame 19 having a perforated front surface enough to permit the ready passage of air therethrough. The frame 19 is provided to keep the filter 18 at a proper distance off the hole, so that suction developed by the fan 6 will not cause the filter 18 to be sucked into the hole 7.

A flexible hose 22 may be connected to the inlet 10 for increased convenience of dust collecting operation.

Since the system of the present invention has so far been expounded, operation will be briefly touched upon to provide a better understanding of the invention.

When the fan 6 is energized, negative pressure developed inside the shell 1 drives ambient dust-carrying air to enter the lower chamber 5 through the inlet 10 and form a vortex. The swirling air then enters the drum 15, leaving behind the larger dust particles caught up in the cylindrical cloth 16, through the air gap beneath the plate 3. The swirling air develops into a rapid vortex due to the venturi effect. Upon impinging upon the disk 17 within the drum 15, the flowing air further develops into a swirling flow at an accelerated rate and moves at a high speed through the duct 2 and then the exhaust hole 7, while separating the dust particles by centrifugalization. The centrifugalized dust and dirt are allowed to drop along the inside wall surface of the drum 15, passing the disk 17, onto the bottom plate 9.

Figure 2:
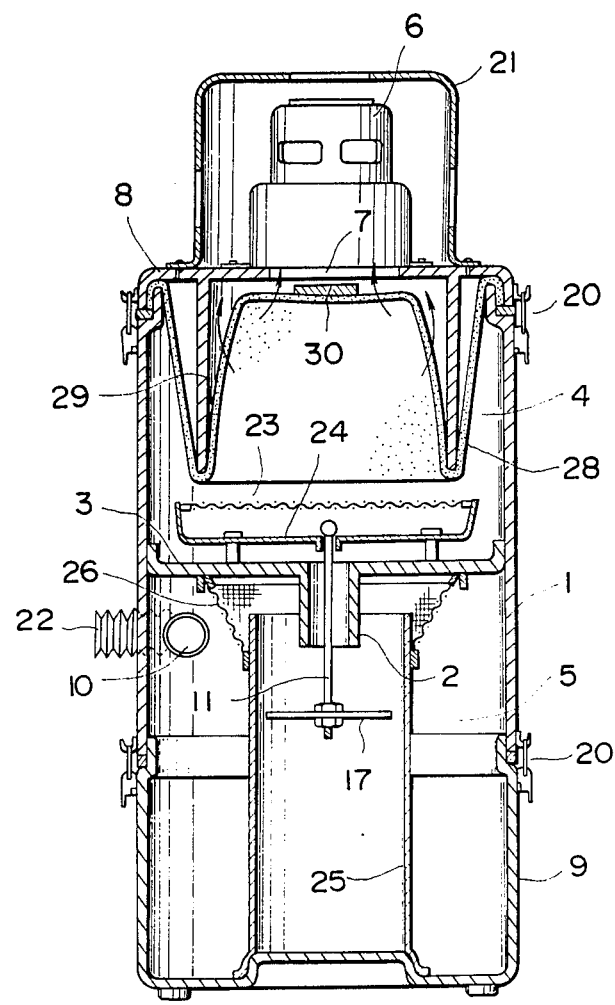
FIG. 2 is a cross-section view of a second preferred embodiment of the present invention.

FIG. 2 shows another preferred embodiment of the present invention, in which a cyclone drum 25 is directly mounted in fixed position on the bottom lid 9. The drum 25 carries at an upper end thereof a wired cloth 26 formed into a conical shape adapted for screening the larger dust particles from a swirling flow of air introduced through the inlet 10.

In the upper chamber 4 is provided a flexible filter 28 that is loosely spread over a cylinder-shaped frame 29, which is provided to keep the flexible filter 28 away from the exhaust hole 7 so that, even when negative pressure developed in the hole 7 by the fan 6 pulls the filter to full upward swelling, it will not be sucked into the hole. A weight 30 is sewn to the center of the filter 28 to give momentum to the filter as it is swung back and struck against a horizontally spread wired cloth 23 over the plate 3 to shake off the dust pargticles that might remain adhered to the backside of the filter, as when the fan 6 is de-energized to remove the suction. A dust tray 24 is mounted just below the cloth 23 to receive such loosened dust from the filter 28.

Although, in the above preferred embodiments, the swirling air in the upper chamber 4 is made to flow into the drum through the air gap defined betweent he plate 3 and the upper end of the drum 25, in an alternate embodiment, a hole or holes may be provided in the wall of the drum 25 to permit the entrance of flowing inside air. Such holes may preferably be formed to hold their axis at an angle tangential to the circular circumference of the drum so that the air entering the holes will flow along the inside wall of the drum into a proper vortex.

It is to be understood that changes and modifications are possible without departing from the spirit of the present invention and that the scope of the invention should be limited, not by the above descriptions and drawings given merely by way of illustration, but by the appended claims which follows.

What is claimed is:

1. A cyclone dust collector comprising:
an airtight shell;
a horizontal dividing plate mounted in said shell and dividing the interior of said shell into upper and lower dust chambers;
suction means communicating with said upper dust chamber;
a communicating duct extending downward into said lower chamber from said dividing plate and comprising means for providing air flow communication between said upper and lower chambers;
tangential air inlet means in said lower chamber, whereby said suction means can cause dust laden air to enter said lower chamber through said air inlet means and form a cyclone flow therein;
a cyclone drum in said lower chamber and having a circumferential surface, an unrestricted open top end and a closed bottom end;
means for supporting said cyclone drum in said lower chamber such that an air gap is formed between said plate and an edge of said circumferential surface at said open top end, said air gap being dimensioned such that swirling air entering said cyclone drum therethrough is accelerated at said air gap, and such that a bottom of said communicating duct extends into said cyclone drum; and
a horizontal disc supported in said cyclone drum between said bottom of said communicating duct and said bottom end of said cyclone drum, whereby said cyclone drum is vertically divided into two chambers, a lower one of which is isolated from swirling air in an upper one thereof.

2. A dust collector as set forth in claim 1, wherein said supporting means comprises a hanger member extending through said communicating duct and into said lower dust chamber, said cyclone drum and disk being secured on said hanger member.

3. A dust collector as set forth in claim 1, wherein said supporting means comprises said cyclone drum mounted directly on a bottom of said shell.

4. A dust collector as set forth in claim 1 including a cylindrical filter member enclosing said circumferential surface of said cyclone drum.

5. A dust collector as set forth in claim 1 including a filter member in said upper chamber, said filter member being upward spread opposite said suction means.

6. A dust collector as set forth in claim 5, wherein said filter member is loosely fixed in said upper dust chamber and is equipped with a weight attached to the center thereof.

7. A dust collector as set forth in claim 5, wherein said filter member is loosely fixed in said upper dust chamber and is supprted against a rigid frame that extends downward in such a manner to enclose said suction means, when suction is developed by said suction means.

8. A dust collector as set forth in claim 1, wherein said shell has a removable bottom.

* * * * *